Feb. 7, 1950 M. A. LISSMAN 2,497,055

FREQUENCY CONVERTER

Filed May 1, 1946

INVENTOR
MARCEL A. LISSMAN
BY Elmer J. Gorn
ATTY.

Patented Feb. 7, 1950 2,497,055

UNITED STATES PATENT OFFICE 2,497,055

FREQUENCY CONVERTER

Marcel A. Lissman, Cambridge, Mass., assignor to Raytheon Manufacturing Company, Newton, Mass., a corporation of Delaware Application May 1, 1946, Serial No. 666,465

5 Claims. (Cl. 250—36)

Figure 1:
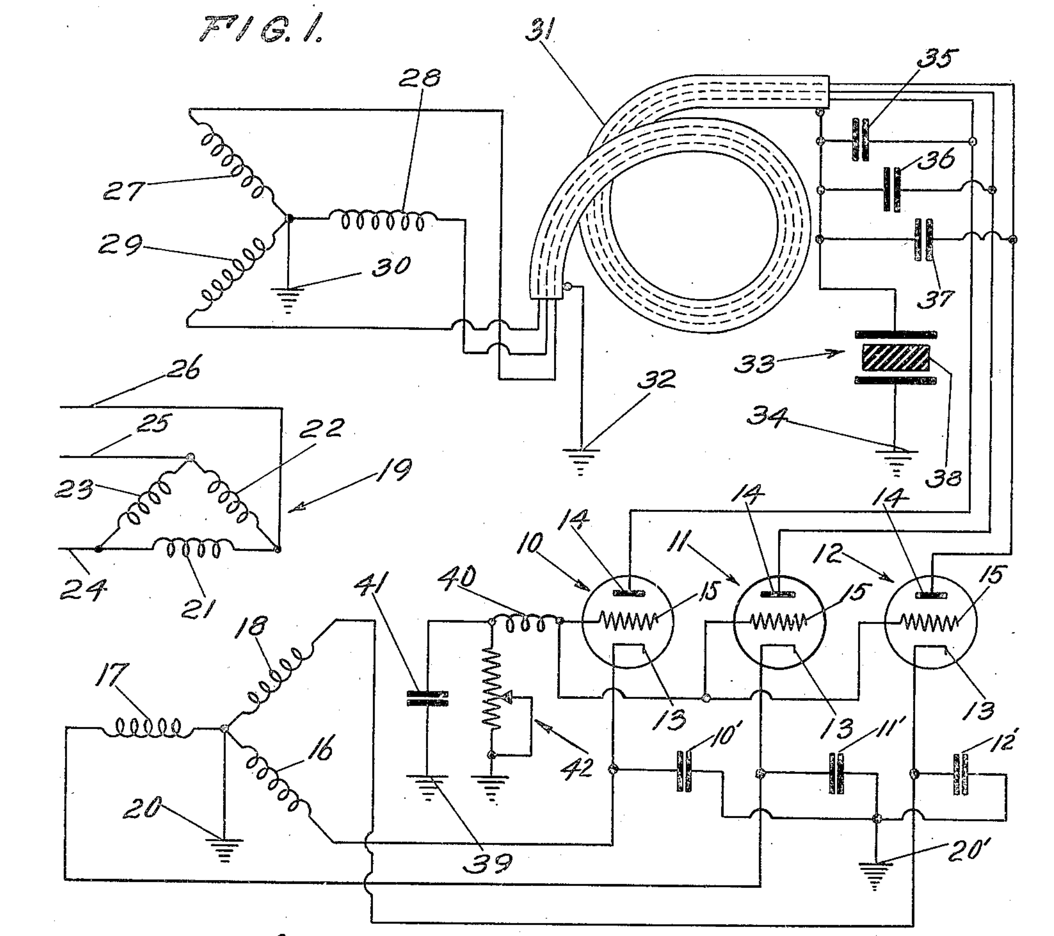

This invention relates to frequency converters, and more particularly to aperiodic frequency converters especially suitable for transforming commercial power supply frequencies to higher frequencies.

While not limited thereto, the present invention is admirably adapted for generating, directly from the raw alternating current of commercial power lines, the high-frequency power utilized in induction or dielectric heating.

Apparatus of the type to which the present invention relates generally comprises a plurality of oscillatory circuits having a single frequency-determining network resonant to the frequency desired of the output of the device, said oscillatory circuits including electron-discharge devices which, when suitably energized, for example, from a multi-phase commercial power source, permit their respective oscillatory circuits successively to function, whereby said frequency-determining network is continuously excited at the aforesaid resonant frequency.

Existing systems of the character just described have been found to be inefficient and wasteful due to the method of commutating their electron-discharge devices, said commutating method being such that each electron-discharge device depends upon rectification in its own control electrode circuit to maintain itself biased substantially to cut-off during the time intervals each is intended to be inoperative. The control electrode current thus flowing depletes the power available in the output circuit, that is, in the frequency-determining network above referred to.

Furthermore, the commutating circuits themselves have been complicated, and of such a nature that, when the commutating voltage is introduced therein, said voltage contributes nothing toward the power output of the converter.

It is, therefore, one of the objects of the present invention generally to improve aperiodic frequency converters of the hereinbefore mentioned type.

It is another object of the present invention to provide a frequency converter which operates under conditions of efficiency, stability and regulation which are comparable to those of a self-biasing oscillator employing a direct-current power supply.

It is a further object of the present invention to provide a commutating method for a frequency converter operated from a multi-phase power supply which draws a minimum of control electrode current, thereby making greater power available in the output circuit thereof.

It is a still further object of the present invention to simplify the circuits, particularly, the control electrode circuits, previously employed in converters of the type to which the present invention relates, and so design them that the commutating voltage applied thereto actually contributes to the final power output.

These, and other objects of the present invention, which will become more apparent as the detailed description thereof progresses, are attained, briefly, in the following manner:

The invention conventionally contemplates the provision of a plurality of oscillatory circuits having a single frequency-determining network in common, said frequency-determining network being resonant to the frequency desired of the output of the device. Each such oscillatory circuit includes an electron-discharge device for controlling the operation thereof. Energy is applied to said oscillatory circuits from a commercial multiphase power source, the number of said oscillatory circuits corresponding to the number of phases of said power source. For the purposes of this specification, the invention will be described in connection with a three-phase power supply.

The anode-cathode and control electrode circuits of said electron-discharge devices are successively energized, in phase, whereby the oscillatory circuit whose electron-discharge device instantaneously has the most positive potential applied to the anode thereof controls the high-frequency oscillations. As a result, said oscillatory circuits are successively brought into operation to cause the above referred to common frequency-determining network to be continuously excited. Inasmuch as each electron-discharge device conducts for only one-third of the time, greater heat dissipation is permissible, and greater output power is therefore obtainable. The oscillatory circuits are self-biasing, and a single means, common to all of said oscillatory circuits, is utilized to obtain said bias, thereby materially reducing the control electrode current which flows from that associated with commutating methods previously employed.

Preferably, said oscillatory circuits are of the tuned plate-tuned grid type, with the commutating voltage so introduced into a grounded control electrode circuit that it is effectively in series with the anode voltage, whereby the anode-cathode voltage consists of the sum of the voltages applied between the grounded control electrode and anode, and the grounded control electrode and cathode. By means of such an arrangement, the commutating voltage contributes to the power output of the device.

In the accompanying specification there shall be described, and in the annexed drawing shown, an illustrative embodiment of the frequency converter of the present invention. It is, however, to be clearly understood that the present invention is not to be limited to the details herein shown and described for purposes of illustration only, inasmuch as changes therein may be made without the exercise of invention, and within the true spirit and scope of the claims hereto appended.

Figure 2:
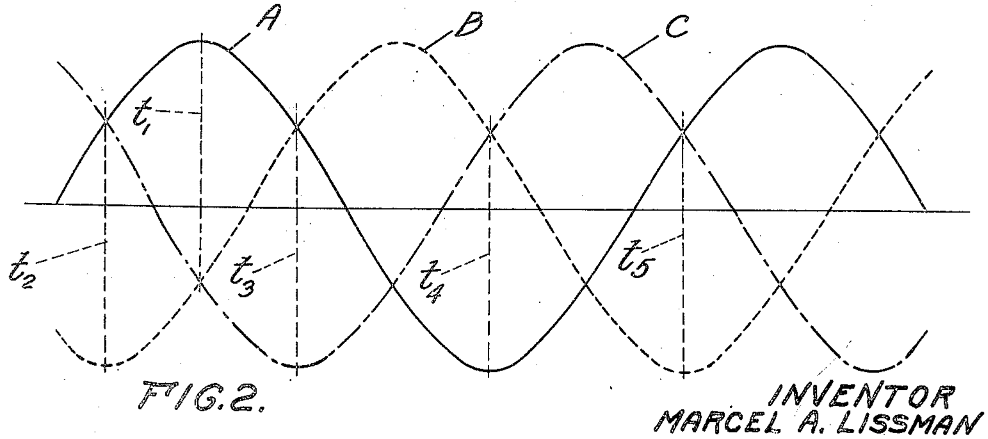

In said drawing, Fig. 1 is a circuit diagram of an aperiodic frequency converter asembled in accordance with the principles of the present invention; and Fig. 2 shows the relationship of the voltages of the three-phase power supply utilized in connection with the circuit of Fig. 1.

Referring now more in detail to the aforesaid illustrative embodiment of the present invention, with particular reference to Fig. 1 of the drawing, the numerals 10, 11 and 12 generally designate electron-discharge devices each of which includes a cathode 13, an anode 14, and a control electrode 15.

The cathodes 13 of the electron-discharge devices 10, 11 and 12 are connected, respectively, through secondary windings 16, 17 and 18 of a three-phase power transformer 19, to ground, as at 20, and, respectively, through radio-frequency by-pass capacitors 10', 11' and 12', to ground, as at 20'. Said transformer additionally includes primary windings 21, 22 and 23 connected to the lines 24, 25 and 26 of a three-phase power source, and also another group of secondary windings 27, 28 and 29 which are so disposed with respect to the secondary windings 16, 17 and 18 as to be 180° out of phase, respectively, therewith. One end of each of the windings 27, 28 and 29 is grounded, as at 30. The opposite ends of said last-named windings are connected to the respective anodes 14 of the electron-discharge devices 10, 11 and 12, the conductors connecting said windings to said anodes being, preferably, threaded through a hollow, coiled conductor 31, one end of which is grounded, as at 32, and the other end of which is connected to one of the plates of a capacitor 33. By so threading the connections between the windings and anodes, the necessity for radio-frequency chokes is eliminated. The remaining plate of the capacitor 33 is grounded, as at 34, said capacitor 33 and said coiled conductor 31 constituting a tank circuit resonant to the frequency desired of the output of the device. Said tank circuit is coupled to the respective anodes 14 of the electron-discharge devices 10, 11 and 12 through capacitors 35, 36 and 37. When the device is employed for dielectric heating, the plates of the capacitor 33 may receive load 38 therebetween.

The control electrodes 15 of the electron-discharge devices 10, 11 and 12 are all connected to ground, as at 39, through an inductor 40 and capacitor 41, the latter being shunted by a potentiometer 42.

There is thus presented an aperiodic frequency converter which is designed to operate from a multi-phase commercial power supply, and which comprises a plurality of tuned-plate, tuned-grid oscillatory circuits having frequency-determining networks in common, said oscillatory circuits being successively operable, as will now be described, to continuously excite said frequency-determining networks at the above referred to output frequency of the device.

In Fig. 2 of the drawing, there are shown three voltages, A, B and C, corresponding to the three-phases, spaced 120° apart, of the commercial power lines 24, 25 and 26. The voltages induced in the secondary windings 27, 28 and 29 are in phase opposition, respectively, to the voltages induced in the secondary windings 16, 17 and 18, and the former are intended to be of considerably greater magnitude than the latter. It will also be apparent that each of the voltages A, B and C is more positive than the other two for one-third of the time.

Now, the method of commutating the oscillatory circuits of the present invention is such that the electron-discharge device having the instantaneously most positive potential applied to its anode controls the high-frequency oscillations of the device, the conducting state of said last-named electron-discharge device adjusting the bias applied to each of the electron-discharge devices in a manner similar to conventional self-biasing oscillators having direct-current power supplies. In other words, as each electron-discharge device becomes conducting, such control electrode rectification occurs therein as to maintain the remaining electron-discharge devices in a non-conducting state, with such a negative potential on the control electrodes of said last-named electron-discharge devices that substantially no control electrode rectification can take place therein.

Consider the time $t_1$ indicated in Fig. 2 of the drawing, and assume the peak anode voltage across the winding 27 to be 4,500 volts and the peak radio-frequency drive on the control electrodes of all of the electron-discharge devices to be 500 volts. Further assume that with the above-mentioned radio-frequency drive applied to the control electrode of the electron-discharge device 10, and without the commutating voltage across the winding 16 being applied to said control electrode, the resistance value of the effective portion of the potentiometer 42 is such that, due to control electrode rectification in said electron-discharge device 10, there is a normal direct-current voltage drop across said effective portion of the potentiometer of 250 volts negative. Under the foregoing conditions, when, in addition to the radio-frequency drive, the commutating voltage of 500 volts is applied to the cathode of the electron-discharge device 10, the control electrode thereof will have a positive excursion of 250 volts, and said last-named electron-discharge device will become conducting in phase with the power supply voltage A between the times $t^2$ and $t^3$, provided the effective portion of the potentiometer 42 is increased to obtain an additional 500 volt direct-current drop thereacross. It will be noted that while the anode of the electron-discharge device 10 is going positive with respect to the control electrode thereof as a result of the voltage across the winding 27, the cathode of said electron-discharge device 10 is going negative with respect to said control electrode as a result of the out-of-phase voltage across the secondary winding 16. Thus, the anode-cathode voltage is the sum of the voltages across said windings 27 and 16, so that the commutating voltage actually contributes to the output power of the device.

It will also be noted that, at the instant $t_1$, all control electrodes will be depressed 750 volts below ground potential, while the voltages across the secondary windings 17 and 18 will be 250 volts positive with respect to ground. As a result, biasing voltages will be applied to the control electrodes of the electron-discharge devices 11 and 12 amounting to 1000 volts negative with respect to the cathodes thereof. Hence, the latter two electron-discharge devices, when energized by the 500 volts radio-frequency drive, will still be biased 500 volts negative, more than enough to maintain them in a non-conducting state and prevent them from drawing control electrode current.

When the time $t_3$ is reached, commutation takes place, the electron-discharge device 11 takes over control of the circuit, and the devices 10 and 12 are maintained non-conducting. Finally, when the time $t_4$ is reached, commutation again takes place, and between said time $t_4$ and time $t_5$, the electron-discharge device 12 conducts, and maintains the devices 10 and 11 in a non-conducting state.

While particular voltage values have been assumed in the foregoing explanation, it is to be clearly understood that these values are merely illustrative, and the components of the device may be adjusted to obtain any other values which will result in commutation of the character described. It is to be further understood that while the electron-discharge devices have been shown herein as having their cathodes grounded for radio-frequency energy, said devices may be inverted so as to have their anodes at ground potential. It is to be still further understood that while tuned-plate, tuned-grid oscillators have been discussed herein, any other type of oscillator will function just as well.

This completes the description of the aforesaid illustrative embodiment of the present invention. It will be noted from all of the foregoing that the present invention provides a simple and efficient device for converting commercial power frequencies to higher frequencies. It will further be noted that the device operates under conditions of efficiency, stability and regulation comparable to those of a conventional self-biasing oscillator having a direct-curent power supply. It will be still further noted that control electrode rectification in the oscillation-controlling electron-discharge device alone controls the biasing of the remaining electron-discharge devices, it will finally be noted that due to the method of introducing the commutating voltages, said voltages themselves contribute to the output power of the device.

Other objects and advantages of the present invention will readily occur to those skilled in the art to which the same relates.

What is claimed is:

1. An aperiodic frequency converter comprising: a plurality of oscillatory circuits having a single frequency-determining network in common, said frequency-determining network being resonant to the frequency desired of the output of said converter; each of said oscillatory circuits including an electron-discharge device having a cathode, an anode, and a control electrode; an impedance device connecting the control electrodes of all of said electron-discharge devices to a common point; means, adapted to be connected to a multi-phase power supply of a frequency different than that desired of the output of said converter, for successively applying potentials between each of the anodes of said electron-discharge devices and said common point; and means, also adapted to be connected to said power supply, for successively applying potentials between each of the cathodes of said electron-discharge devices and said common point; said first and second-named potentials being in phase opposition with respect to each other, whereby said electron-discharge devices and their receptive oscillatory circuits are successively energized to continuously excite said frequency-determining network.

2. An aperiodic frequency converter comprising: a plurality of oscillatory circuits having a single frequency-determining network in common, said frequency-determining network being resonant to the frequency desired of the output of said converter; each of said oscillatory circuits including an electron-discharge device having a cathode, an anode, and a control electrode; an impedance device connecting the control electrodes of all of said electron-discharge devices to a common point; means, adapted to be connected to a multi-phase power supply of a frequency different than that desired of the output of said converter, for successively applying potentials between each of the anodes of said electron-discharge devices and said common point; and means, also adapted to be connected to said power supply, for successively applying potentials between each of the cathodes of said electron-discharge devices and said common point; said first and second-named potentials being in phase opposition with respect to each other, and said impedance device being of such value that, due to control electrode rectification, the bias developed thereacross permits said electron-discharge devices to become successively conducting to successively energize their respective oscillatory circuits and continuously excite said frequency-determining network.

3. An aperiodic frequency converter comprising: a plurality of oscillatory circuits having a single frequency-determining network in common, said frequency-determining network being resonant to the frequency desired of the output of said converter; each of said oscillatory circuits including an electron-discharge device having a cathode, an anode, and a control electrode; an impedance device connecting the control electrodes of all of said electron-discharge devices to a common point; means adapted to be connected to a multi-phase power supply of a frequency different than that desired of the output of said converter, for successively applying positive potentials between each of the anodes of said electron-discharge devices and said common point; and means, also adapted to be connected to said power supply, for successively applying negative potentials between each of the cathodes of said electron-discharge devices and said common point; said impedance device being of such value that, due to control electrode rectification, the bias developed thereacross permits said electron-discharge devices to become successively conducting to successively energize their respective oscillatory circuits and continuously excite said frequency-determining network.

4. An aperiodic frequency converter comprising: a plurality of oscillatory circuits having a single frequency-determining network in common, said frequency-determining network being resonant to the frequency desired of the output of said converter; each of said oscillatory circuits including an electron-discharge device having a cathode, an anode, and a control electrode; and means, adapted to be connected to a multiphase power supply of a frequency different than that desired of the output of said converter, for applying potentials, in series, between the anode and control electrode, and the control electrode and cathode of each of said electron-discharge devices, successively, whereby said electron-discharge devices and their respective oscillatory circuits are successively energized to continuously excite said frequency-determining network.

5. An aperiodic frequency converter comprising: a plurality of oscillatory circuits having a single frequency-determining network in common, said frequency-determining network being resonant to the frequency desired of the output of said converter; each of said oscillatory circuits including an electron-discharge device having a cathode, an anode, and a control electrode; an impedance device connecting the control electrodes of all of said electron-discharge devices to a common point; and means, adapted to be connected to a multi-phase power supply of a frequency different than that desired of the output of said converter, for applying potentials, in series, between the anode and control electrode, and the control electrode and cathode of each of said electron-discharge devices, successively, whereby said electron-discharge devices and their respective oscillatory circuits are successively energized to continuously excite said frequency-determining network; said impedance device being of such value that, as each of said electron-discharge devices becomes conducting, the bias developed thereacross due to control electrode rectification permits the conducting electron-discharge device to continue to conduct but maintains the remaining electron-discharge devices non-conducting.

MARCEL A. LISSMAN.

REFERENCES CITED

The following references are of record in the file of this patent:

UNITED STATES PATENTS

| Number | Name | Date |
|---|---|---|
| 2,076,368 | Fyler | Apr. 6, 1937 |
| 2,288,362 | McArthur | June 30, 1942 |
| 2,288,364 | McArthur | June 30, 1942 |
| 2,319,072 | McArthur | May 11, 1943 |